US011368986B2

(12) United States Patent
Liu et al.

(10) Patent No.: US 11,368,986 B2
(45) Date of Patent: *Jun. 21, 2022

(54) METHOD AND APPARATUS FOR RANDOM ACCESS IN A WIRELESS COMMUNICATION SYSTEM (71) Applicant: Telefonaktiebolaget LM Ericsson (publ), Stockholm (SE)

(72) Inventors: Jinhua Liu, Beijing (CN); Jan Christoffersson, Luleå (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 17/002,929

(22) Filed: Aug. 26, 2020

(65) Prior Publication Data
US 2020/0389926 A1 Dec. 10, 2020

Related U.S. Application Data (63) Continuation of application No. 16/074,297, filed as application No. PCT/CN2018/075203 on Feb. 5, 2018, now Pat. No. 10,791,577.

(30) Foreign Application Priority Data

Mar. 24, 2017 (WO) ................ PCT/CN2017/078200

(51) Int. Cl.
*H04W 72/08* (2009.01)
*H04W 74/08* (2009.01)
(Continued)

(52) U.S. Cl.
CPC ....... *H04W 74/0833* (2013.01); *H04W 72/02* (2013.01); *H04W 72/0446* (2013.01); *H04W 88/023* (2013.01)

(58) Field of Classification Search
CPC ............. H04W 74/0833; H04W 72/02; H04W 72/0446; H04W 88/023
See application file for complete search history.

(56) References Cited

U.S. PATENT DOCUMENTS 10,791,577 B2 * 9/2020 Liu .................... H04W 74/0833
2006/0023629 A1 * 2/2006 Kim .................. H04W 72/1284
370/235

(Continued)

FOREIGN PATENT DOCUMENTS

CN 101978763 A 2/2011
CN 102170677 A 8/2011
(Continued)

OTHER PUBLICATIONS

Author Unknown, "Technical Specification Group Radio Access Network; Evolved Universal Terrestrial Radio Access (E-UTRA); Physical Channels and Modulation (Release 10)," Technical Specification 36.211, Version 10.1.0, 3GPP Organizational Partners, Mar. 2011, 103 pages.

(Continued)

*Primary Examiner* — Christine Ng
(74) *Attorney, Agent, or Firm* — Withrow & Terranova, PLLC (57) ABSTRACT Embodiments of the present disclosure provide methods, apparatuses and computer program products for random access in a wireless communication system. A method in a terminal device comprises receiving a random access configuration from a network device, the random access configuration including information for determining a set of candidate subframe numbers and a set of candidate system frame numbers for transmitting a random access preamble; transmitting the random access preamble in a subframe within a radio frame, the subframe being associated with a subframe number, and the radio frame being associated with (Continued)

a system frame number; wherein the subframe number is selected from the set of candidate subframe numbers, and/or, the system frame number is selected from the set of candidate system frame numbers t, based on a size of a Message 3 (Msg3) to be transmitted by the terminal device to the network device during the random access.

8 Claims, 3 Drawing Sheets

(51) Int. Cl.
*H04W 72/02* (2009.01)
*H04W 72/04* (2009.01)
*H04W 88/02* (2009.01)

(56) References Cited

U.S. PATENT DOCUMENTS

| | | | |
|---|---|---|---|
| 2010/0074130 A1 | 3/2010 | Bertrand et al. | |
| 2014/0079011 A1* | 3/2014 | Wiberg | H04W 74/006 370/329 |
| 2016/0227582 A1* | 8/2016 | Vajapeyam | H04W 52/281 |
| 2017/0019932 A1* | 1/2017 | Su | H04L 43/16 |
| 2017/0071010 A1* | 3/2017 | Lim | H04W 72/042 |

FOREIGN PATENT DOCUMENTS

| | | |
|---|---|---|
| CN | 102647783 A | 8/2012 |
| WO | 2013047964 A1 | 4/2013 |

OTHER PUBLICATIONS

Samsung, "R2-166065: Random Access Procedure in NR," 3GPP TSG-RAN WG2 95bis, Oct. 10-14, 2016, Kaohsiung, Taiwan, 3GPP, 7 pages.

ZTE, "R1-160483: Random access procedure for NB-IoT," 3GPP TSG RAN WG1 #84, Feb. 15-19, 2016, St. Julian's, Malta, 3GPP, 3 pages.

Extended European Search Report for European Application No. 18742692.9, dated Jan. 29, 2019, 7 pages.

International Search Report and Written Opinion for International Patent Application No. PCT/CN2018/075203, dated Apr. 27, 2018, 9 pages.

International Preliminary Report on Patentability for International Patent Application No. PCT/CN2018/075203, dated Jul. 22, 2019, 8 pages.

Non-Final Office Action for U.S. Appl. No. 16/074,297, dated Dec. 4, 2019, 25 pages.

Final Office Action for U.S. Appl. No. 16/074,297, dated Mar. 17, 2020, 17 pages.

Notice of Allowance for U.S. Appl. No. 16/074,297, dated May 28, 2020, 11 pages.

Ericsson, et al., "R2-165816: Clarification of the Random Access procedure for NB-IoT," 3GPP TSG-RAN WG2, Meeting #95, Aug. 22-26, 2016, Gothenburg, Sweden, 12 pages.

First Office Action for Chinese Patent Application No. 201880001070.5, dated Aug. 23, 2021, 13 pages.

* cited by examiner

METHOD AND APPARATUS FOR RANDOM ACCESS IN A WIRELESS COMMUNICATION SYSTEM

This application is a continuation of U.S. application Ser. No. 16/074,297, filed Jul. 31, 2018, which is a 35 U.S.C. § 371 national phase filing of International Application No. PCT/CN2018/075203, filed Feb. 5, 2018, which claims the benefit of International Application No. PCT/CN2017/078200, filed Mar. 24, 2017, the disclosures of which are incorporated herein by reference in their entireties.

TECHNICAL FIELD

The non-limiting and example embodiments of the present disclosure generally relate to a technical field of wireless communication, and specifically to methods, apparatuses and computer program products for random access in a wireless communication system.

BACKGROUND

This section introduces aspects that may facilitate better understanding of the disclosure. Accordingly, the statements of this section are to be read in this light and are not to be understood as admissions about what is in the prior art or what is not in the prior art.

In wireless communication systems, a terminal device has to setup a connection with a network node before transmitting any data to the network node. A procedure for a terminal device to request a connection setup is commonly referred to as random access (RA). A terminal device may perform the random access on a carrier which it determines to camp on based on a result of cell search. The random access may be performed either using a contention based scheme which requires a terminal device to select a resource for the random access from a shared resource pool or a contention-free scheme which allows the terminal device to perform the random access using an assigned dedicated resource. A contention based scheme requires a mechanism for a network node to resolve any contention due to multiple terminals trying to access the network using a same random-access resource.

In a random access procedure, a terminal device may transmit a random access preamble (also referred to as a physical random access channel (PRACH) preamble, a preamble, a RACH request, or Msg1) to a network device. Transmission of the random access preamble may use a resource determined based on PRACH Configuration Index. More details on these parameters and their values may be found, for example, in 3GPP TS 36.211 v10.1.0, Section 5.7 Physical random access channel. In response to receiving the random access preamble, the network device transmits, to the terminal device a random access response (RAR) message (which may also be referred to as Msg2) carrying a timing advance (TA) command to adjust the UL transmission timing of the terminal device. The terminal device transmits, to the network device, a message 3 (which may also be referred to as Msg3) using the resource assigned/scheduled by the network device via the RAR message. In response to the received Msg3, the network device may transmit a contention-resolution message (which may also be referred to as Msg4) to the terminal device.

SUMMARY

Current design for random access may not be suitable for some new wireless communication systems, for example, the fifth generation (5G) or New Radio (NR). In order to provide a more efficient random access procedure, methods, apparatuses and computer program products are provided in the present disclosure. It will be appreciated that embodiments of the present disclosure are not limited to NR system information transmission/reception in a 5G system, but could be more widely applied to any wireless communication system where similar problems exist.

Various embodiments of the present disclosure mainly aim at providing methods, apparatuses and computer program products for information transmitting and receiving. Other features and advantages of embodiments of the present disclosure will be understood from the following description of various embodiments when read in conjunction with the accompanying drawings, which illustrate, by way of example, the principles of embodiments of the present disclosure.

In a first aspect of the disclosure, there is provided a method in a terminal device. The method comprises: receiving a random access configuration from a network device, the random access configuration including information for determining a set of candidate subframe numbers and a set of candidate system frame numbers for transmitting a random access preamble; transmitting the random access preamble in a subframe within a radio frame, the subframe being associated with a subframe number, and the radio frame being associated with a system frame number; wherein the subframe number is selected from the set of candidate subframe numbers, and/or, the system frame number is selected from the set of candidate system frame numbers, based on a size of a Msg3 to be transmitted by the terminal device to the network device during the random access.

In some embodiments, the random access preamble may be selected from a set of candidate preambles based on the size of the Msg3.

In a further embodiment, the terminal device may receive a further configuration of a set of thresholds with respect to the size of the Msg3 and a mapping relationship configuration between the set of thresholds and PRACH transmissions; and determining a PRACH transmission based on the set of thresholds to indicate the size of the Msg3 to the network device.

In a second aspect of the disclosure, there is provided a method in a network device. The method comprise: transmitting a random access configuration to a terminal device, the random access configuration including information for determining a set of candidate subframe numbers and a set of candidate system frame numbers for transmitting a random access preamble; receiving, from the terminal device, a random access preamble in a subframe within a radio frame, the subframe being associated with a subframe number, and the radio frame being associated with a system frame number, wherein the subframe number is selected from the set of candidate subframe numbers, and/or, the system frame number is selected from the set of candidate system frame numbers, based on a size of a Msg3 to be transmitted by the terminal device to the network device during the random access; and determining the size of the Msg3, to be transmitted by the terminal device during the random access, based on at least one of the subframe number and the system frame number.

In some embodiments, the network device may determine the size of the Msg3 further based on the random access preamble.

In a third aspect of the disclosure, there is provided a terminal device for random access in a wireless communication network. The terminal device comprises a processor and a memory, said memory containing instructions executable by said processor whereby said apparatus is operative to: receive a random access configuration from a network device, the random access configuration indicating a set of candidate subframe numbers and a set of candidate system frame numbers for transmitting a random access preamble; transmit the random access preamble in a subframe within a radio frame, the subframe being associated with a subframe number, and the radio frame being associated with a system frame number; wherein the subframe number is selected from the set of candidate subframe numbers, and/or, the system frame number is selected from the set of candidate system frame numbers, based on a size of a Msg3 to be transmitted by the terminal device to the network device during the random access.

In a fourth aspect of the disclosure, there is provided a network device for random access in a wireless communication network. The network device comprises a processor and a memory, said memory containing instructions executable by said processor whereby said apparatus is operative to: transmit a random access configuration to a terminal device, the random access configuration indicating a set of candidate subframe numbers and a set of candidate system frame numbers for transmitting a random access preamble;

receive, from the terminal device, a random access preamble in a subframe within a radio frame, the subframe being associated with a subframe number, and the radio frame being associated with a system frame number; wherein the subframe number is selected from the set of candidate subframe numbers, and/or, the system frame number is selected from the set of candidate system frame numbers, based on a size of a Msg3 to be transmitted by the terminal device to the network device during the random access, and determine the size of the Msg3, to be transmitted by the terminal device during the random access, based on at least one of the subframe number and the system frame number.

In a fifth aspect of the disclosure, there is provided a computer readable storage medium having a computer program product embodied thereon, the computer program product including instructions which, when executed on at least one processor, cause the at least one processor to carry out any method according to the first aspect of the present disclosure.

In a sixth aspect of the disclosure, there is provided a computer readable storage medium having a computer program product embodied thereon, the computer program product including instructions which, when executed on at least one processor, cause the at least one processor to carry out any method according to the second aspect of the present disclosure.

According to various aspects and embodiments as mentioned above, efficiency of the random access procedure may be improved.

BRIEF DESCRIPTION OF THE DRAWINGS

The above and other aspects, features, and benefits of various embodiments of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

As used herein, the term "wireless communication network" refers to a network following any suitable wireless communication standards, such as NR, Long Term Evolution (LTE), LTE-Advanced (LTE-A), Wideband Code Division Multiple Access (WCDMA), High-Speed Packet Access (HSPA), and so on. Furthermore, the communications between network devices in the wireless communication network may be performed according to any suitable generation communication protocol, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G, 2.75G, the third generation (3G), the fourth generation (4G), 4.5G, the fifth generation (5G) communication protocols, wireless local area network (WLAN) standards, such as the IEEE 802.11 standards; and/or any other appropriate wireless communication standard, and/or any other protocols either currently known or to be developed in the future.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a gNB, a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably.

The terminal device may support device-to-device (D2D) communication, for example by implementing a 3GPP standard for sidelink communication, and may in this case be referred to as a D2D communication device.

As yet another example, in an Internet of Things (TOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a DL transmission refers to a transmission from the network device to a terminal device, and an UL transmission refers to a transmission in an opposite direction.

Figure 1:
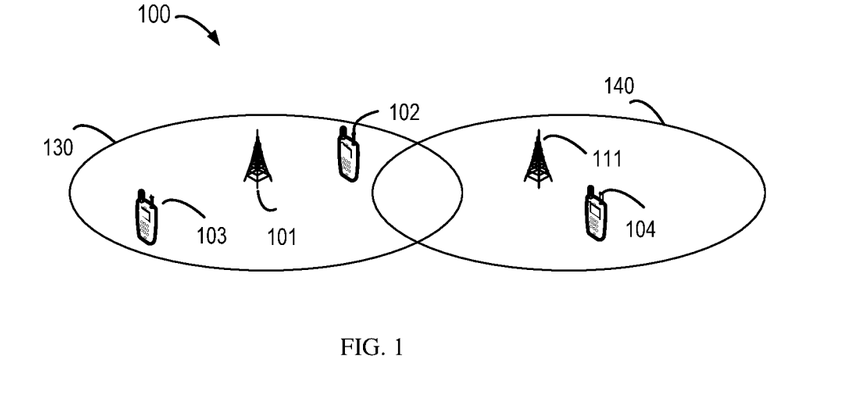
FIG. 1 illustrates an example wireless communication network in which embodiments of the present disclosure may be implemented.

FIG. 1 illustrates an example wireless communication network 100 in which embodiments of the disclosure may be implemented. As shown in FIG. 1, the wireless communication network 100 may include one or more network devices, for example network devices 101 and 111, which may be in a form of an eNB or gNB, providing cell 130 and cell 140 respectively. It will be appreciated that the network device 101 or 111 could also be in a form of a Node B, Base Transceiver Station (BTS), and/or Base Station Subsystem (BSS), AP and the like. The network device 101 may provide radio connectivity to a set of terminal devices (for example UEs 102 and 103) within a cell 130, while the network device 111 may provide radio connectivity to another set of terminal devices for example UE 104 in another cell 140 shown in FIG. 1. The network devices 101 and 111 may be in different forms.

In wireless communication systems, a terminal device has to setup a connection with a network node before transmitting any data to the network node. A procedure for a terminal device to request a connection setup is commonly referred to as random access. In a random access procedure, a terminal device transmits a random access preamble (also referred to as a physical random access channel (PRACH) preamble, a preamble, a random access channel (RACH) request, or Msg1) to a network device. Transmission of the random access preamble may use a resource determined based on a random access configuration.

Irrespective of how a PRACH design is adopted in, for example, 3GPP Radio Access Network 1 (RAN1) for a wireless system (for example NR), there may be some corresponding random access configuration (e.g., NR-prach-ConfigIndex, or PRACH-Configuration-Index) which is broadcasted to indicate possible time and frequency configurations. In some cases, there may be PRACH radio resources configured in multiple subframes in one radio frame. Table 5.7.1-2 from 3GPP TS 36.211-v10.1.0 showing examples for random access configurations of Frame structure type 1 is reproduced below as Table 1. More details on parameters shown in Table 1 and their values may be found, for example, in 3GPP TS 36.211 v10.1.0, Section 5.7 Physical random access channel.

TABLE 1

| PRACH Configuration Index | Preamble Format | System frame number | Subframe number |
|---|---|---|---|
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |

TABLE 1-continued

| PRACH Configuration Index | Preamble Format | System frame number | Subframe number |
|---|---|---|---|
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

In response to receiving the random access preamble from a terminal device, a network device transmits, to the terminal device a random access response (RAR) message (which may also be referred to as Msg2) carrying a timing advance (TA) command to adjust the UL transmission timing of the terminal device. The terminal device transmits, to the network device, a message 3 (which may also be referred to as Msg3) using the resource assigned/scheduled by the network device via the RAR message. In response to the received Msg3, the network device may transmit a contention-resolution message (which may also be referred to as Msg4) to the terminal device.

In LTE, a size of the Msg3 may be indicated via a PRACH transmission. In current LTE specification, random access preambles are divided into two groups, i.e., a first Random Access preamble group and a second Random Access preamble group. If the size of Msg3 is smaller than or equal to a preconfigured threshold, UE chooses a Random Access preamble from the first Random Access preamble group, otherwise, the UE selects a random access preamble from the second Random Access preamble group. The eNB may determine the size of Msg3 according to the detected PRACH preamble index and allocate an UL grant to the UE so that there is certain probability for the UE to transmit all data. That is, selection of the Random Access preamble group provides one bit for indicating size of the Msg3.

However, inventors of the present application have observed that such a rough granularity indication of the size of message 3 in LTE may not be enough for NR. In a NR system, a terminal device may transmit a small packet and therefore, it may be desirable that such a small packet can be conveyed during random access, for example using Msg3. To indicate a size of a small packet carried in Msg3, a finer granularity may be required.

In order to solve at least part of the above problems, methods, apparatuses and computer program products have been proposed herein. Some embodiments of the present disclosure provide a solution facilitating an efficient random access procedure. In particular, more information on the size of Msg3 may be provided to the network device during a RACH procedure compared with conventional RACH procedure.

For example, in some embodiments, some parameter(s) in a conventional PRACH configuration may be reused for indication of the size of the Msg3. That is, for the dense PRACH transmission occasions shown in the above Table 1, one may also use PRACH transmission position in time (subframe number) to indicate the size of Msg3.

In some embodiments, subframe number or system frame number (SFN) used for a PRACH transmission may be used to indicate the size of the Msg3. As a further enhancement, any combination of the subframe number, the SFN and the Random Access preamble of a PRACH transmission may be used to indicate the size of the Msg3.

For illustration rather than limitation, some examples for indicating the size of the Msg3 during a RACH procedure are provided below. Though in some examples, the size of the Msg3 is indicated via the subframe number, or the SFN of a PRACH transmission or any combination of the subframe number, the SFN and the Random Access Preamble of the PRACH transmission, in some other embodiments, additional parameters may be used for such indication.

EXAMPLE 1

Use a Subframe Number of a PRACH Transmission to Indicate a Size of a Msg3

For this example, the size of the Msg3 is indicated using the subframe number when the PRACH is transmitted. The subframe number is divided into z groups, and z-1 thresholds for the size of the Msg3 are configured for UE to determine the subframe number for the PRACH transmission. Note that z may be an integer larger than 2, in some embodiments.

For instance, according to Table 1 above, when PRACH Configuration Index is set to 6, there are two transmission opportunities in radio frame subframes 1 and 6, and the transmission opportunities are divided into two groups (referred to as PRACH transmission groups) according to the subframe number of the PRACH transmission: PRACH transmissions at subframe 1 are included into Group 0, and PRACH transmissions at subframe 6 are included into Group 1. UEs may be configured by the base station to transmit PRACH in subframe 1 if a size of a Msg3 is smaller or equal to a configured threshold Y bits and to transmit PRACH in subframe 6 if the size of the Msg3 is larger than the configured threshold Y bits.

EXAMPLE 2

Use a SFN of a PRACH Transmission to Indicate a Size of a Msg3

For this example, the size of the Msg3 is indicated using the SFN when the PRACH is transmitted. The PRACH transmission occurrences are divided into z groups (referred to as PRACH transmission groups) based on the SFN, and a group index for a radio frame may be determined via SFN modulo z, i.e., group index=mod(SFN, z). The z-1 thresholds for the size of the Msg3 are configured for UE to determine the SFN for the PRACH transmission. The UE determines the PRACH transmission group according to a comparison between the size of the Msg3 and the z-1 thresholds for the size of Msg3. Note that z may be an integer larger than 2, in some embodiments.

For instance, according to Table 1 above, when a PRACH Configuration Index is configured to 3, a UE is allowed to transmit PRACH in subframe 1 in any radio frame. It may be configured that PRACH transmission occurrences are divided into two groups, for example, group 0 for PRACH transmissions in radio frames with odd SFNs, and group 1 for PRACH transmissions in radio frames with even SFNs. A threshold of K bits for the size the Msg3 may be configured for the UE. If the size of Msg3 is smaller than or equal to K bits, the UE may transmit the PRACH in a radio frame with a SFN from group 0; otherwise, the UE may transmit the PRACH in a radio frame with a SFN from group 1.

EXAMPLE 3

Use a Combination of any of a Subframe Number, a SFN and Random Access Preamble of PRACH Transmission to Indicate a Size of a Msg3

According to this example, the PRACH transmission occurrences are grouped using any two or all of the subframe number, the SFN and the Random Access preamble of PRACH transmission. PRACH transmission occurrences belonging to different groups (referred to as PRACH transmission groups) indicate different sizes of the Msg3. Corresponding thresholds for the size of the Msg3 may be configured, and UE may determine the PRACH transmission according to a comparison between the size of the Msg3 and the thresholds for the size of the Msg3.

For instance, according to Table 1 above, when PRACH Configuration Index 6 is set, the PRACH may be transmitted in subframe 1 or 6 in any radio frame. The PRACH transmission occurrences may be divided into 4 groups, for example, PRACH transmission group a0 for PRACH transmissions in subframe 1 of a radio frame with an odd SFN, PRACH transmission group a1 for PRACH transmissions in subframe 6 of a radio frame with an odd SFN, PRACH transmission group a2 for PRACH transmissions in subframe 1 of a radio frame with an even SFN, and PRACH transmission group a3 for PRACH transmission in subframe 6 of a radio frame with an even SFN. In correspondence, there are 3 Msg3 threshold sizes, O0, O1, O2 (O0<O1<O2). If the size of Msg3 is smaller than or equal to O0, larger than O0 but smaller or equal to O1, larger than O1 but smaller or equal to O2, larger than O2, the PRACH is transmitted by the UE using a resource belonging to group a0, a1, a2 and a3 respectively.

Similarly, other grouping scheme(s) for the size of the Msg3 may be defined as well. For instance, the PRACH transmission occurrences may be divided into groups based on a subframe number of the PRACH transmission in combination of Random Access preamble grouping. When Random Access preambles are divided into two groups (e.g., preamble group A and B) and PRACH Configuration Index 6 is set, the PRACH transmission opportunities may be divided into 4 groups: group b0 for PRACH transmission using a random access preamble from the preamble group A in subframe 1, group b1 for a PRACH transmission using a random access preamble from the preamble group A in subframe 6, PRACH transmission group b2 for a PRACH transmission using a random access preamble from preamble group B in subframe 1 and PRACH transmission group b3 for a PRACH transmission using a random access preamble from preamble group B in subframe 6. In correspondence, there may be 3 Msg3 threshold sizes, P0, P1, P2 (P0<P1<P2). If the size of the Msg3 is smaller than or equal to P0, larger than P0 but smaller or equal to P1, larger than P1 but smaller or equal to P2, or larger than P2, the PRACH is transmitted by UE using a resource belonging to group b0, b1, b2 and b3 respectively.

For any example above, the UE shall firstly determine which PRACH transmission group shall be used for a PRACH transmission by comparing a size of a Msg3 with preconfigured thresholds to select a PRACH transmission group, then the UE determines a PRACH transmission parameter(s) (identified by, for example but not limited to, a SFN, a subframe number and a Random Access preamble) within a determined PRACH transmission group, and transmits the PRACH using the determined PRACH transmission parameter(s).

For any example above, the base station shall firstly detect a PRACH preamble, secondly determine a group index of the PRACH transmission according to the preconfigured PRACH transmission grouping, thirdly determine the size of the Msg3 range according to a mapping between the PRACH transmission group and a size of a Msg3; determine an UL grant according to the determined size of the Msg3 range, and send the UL grant to the UE for UL small data transmission from the UE.

The system may configure a PRACH transmission grouping scheme and parameters via either system information (SI) or a dedicated Radio Resource Control (RRC) signalling. As one example, other SI may be used to configure the parameters for PRACH transmission grouping and the corresponding thresholds for the size of the Msg3. As another example, the parameters for PRACH transmission grouping and the corresponding thresholds for the size of the Msg3 may be transmitted to the UE via a dedicated RRC signalling when the UE is configured to be in a RRC_Inactive state.

Figure 2:
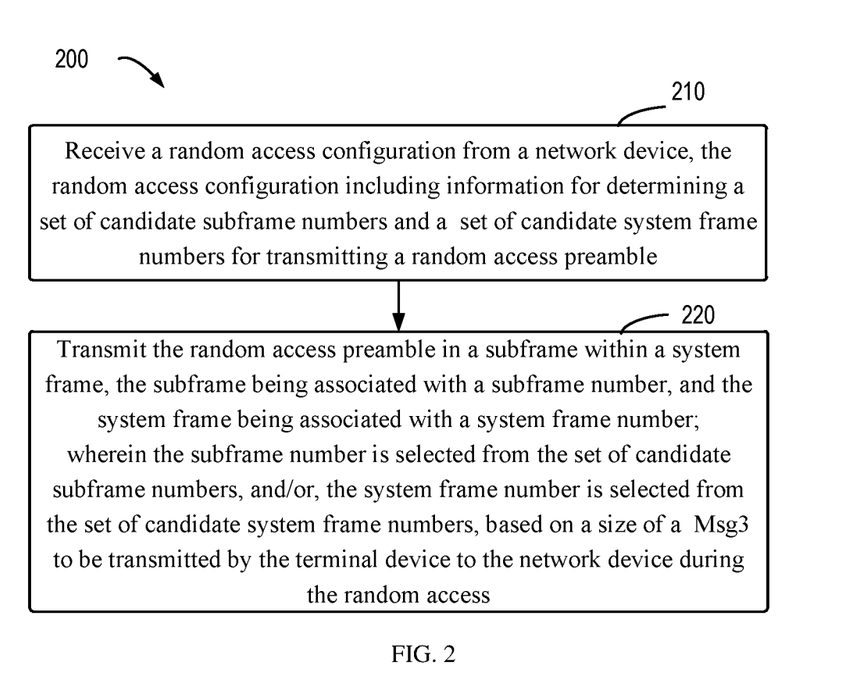
FIG. 2 illustrates a flowchart of a method implemented at a terminal device according to an embodiment of the present disclosure.

Reference is now made to FIG. 2 which shows a flowchart of a method 200 in a terminal device according to an embodiment of the present disclosure. The terminal device may be, for example, any of the terminal devices 102-104 shown in FIG. 1. For ease of discussions, the method 200 will be described below with reference to the terminal device 102 and the environment as described with reference to FIG. 1. However, embodiments of the present disclosure are not limited thereto and may be applied more widely in other scenarios where similar problem exists.

As illustrated in FIG. 2, at block 210, the terminal device 102 receives a random access configuration from a network device 101, the random access configuration including information for determining a set of candidate subframe numbers and a set of candidate system frame numbers (SFNs) for transmitting a random access preamble. Each SFN is associated with a radio frame. At block 220, the terminal device 102 transmits the random access preamble in a subframe within a radio frame. The subframe is associated with a subframe number, and the radio frame is associated with a system frame number. Furthermore, the subframe number is selected from the set of candidate subframe numbers, and/or, the system frame number is selected from the set of candidate system frame numbers, based on a size of a Msg3 to be transmitted by the terminal device to the network device during the random access.

The subframe number and/or the system frame number for transmitting the random access preamble by the terminal device may be used by the network device to estimate a size of a following Msg3 to be transmitted by the terminal device. Therefore, the method 200 enables the network device 101 to grant a proper resource to the terminal device 102 using a RAR message in response to the RACH preamble. The transmission and reception of the following RAR, Msg3 and the Msg4 may be implemented according to, for example, a conventional RACH procedure specified in LTE, but embodiments are not limited thereto.

In some embodiments, the terminal device 102 may receive a further configuration for a set of thresholds with respect to the size of the Msg3 and a mapping configuration between the set of thresholds and PRACH transmissions; and determine a PRACH transmission based on the set of thresholds, to indicate the size of the Msg3 to the network device.

Figure 3:
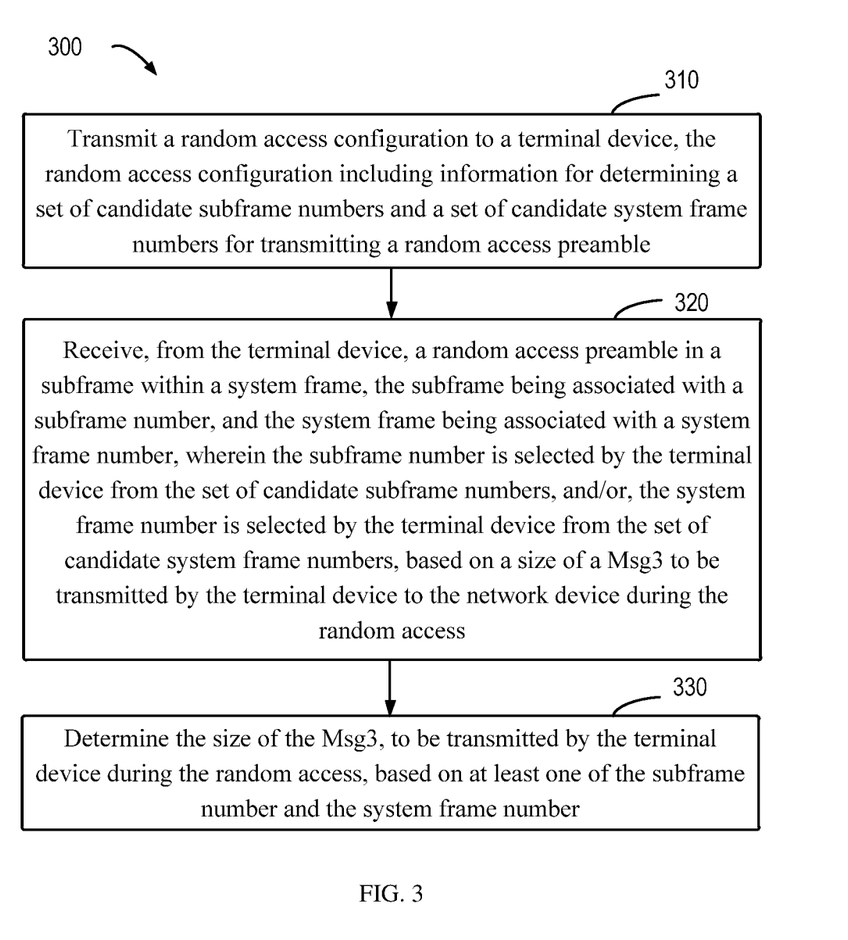
FIG. 3 illustrates a flowchart of a method implemented at a network device according to an embodiment of the present disclosure.

Reference is now made to FIG. 3 which shows a flowchart of a method 300 in a network device according to an embodiment of the present disclosure. The terminal device may be, for example, any of the network devices 101 and 111 shown in FIG. 1. For ease of discussions, the method 300 will be described below with reference to the network device 101 and the environment as described with reference to FIG. 1. However, embodiments of the present disclosure are not limited thereto and may be applied more widely in other scenarios where similar problem exists.

As illustrated in FIG. 3, at block 310, the network device 101 transmits a random access configuration to a terminal device (e.g., terminal device 102). The random access configuration includes information for determining a set of candidate subframe numbers and a set of candidate system frame numbers for transmitting a random access preamble. At block 320, the network device 101 receives, from the terminal device, a random access preamble in a subframe within a radio frame, wherein the subframe is associated with a subframe number, and the radio frame is associated with a system frame number. In addition, the subframe number is selected by the terminal device from the set of candidate subframe numbers, and/or, the system frame number is selected from the set of candidate system frame numbers, based on a size of a Msg3 to be transmitted by the terminal device 102 to the network device 101 during the random access. At block 330, the network device 101 determines the size of the Msg3 to be transmitted by the terminal device during the random access, based on at least one of the subframe number and the system frame number. The determination enables the network device 101 to grant a proper resource to the terminal device for transmitting the Msg3.

Figure 4:
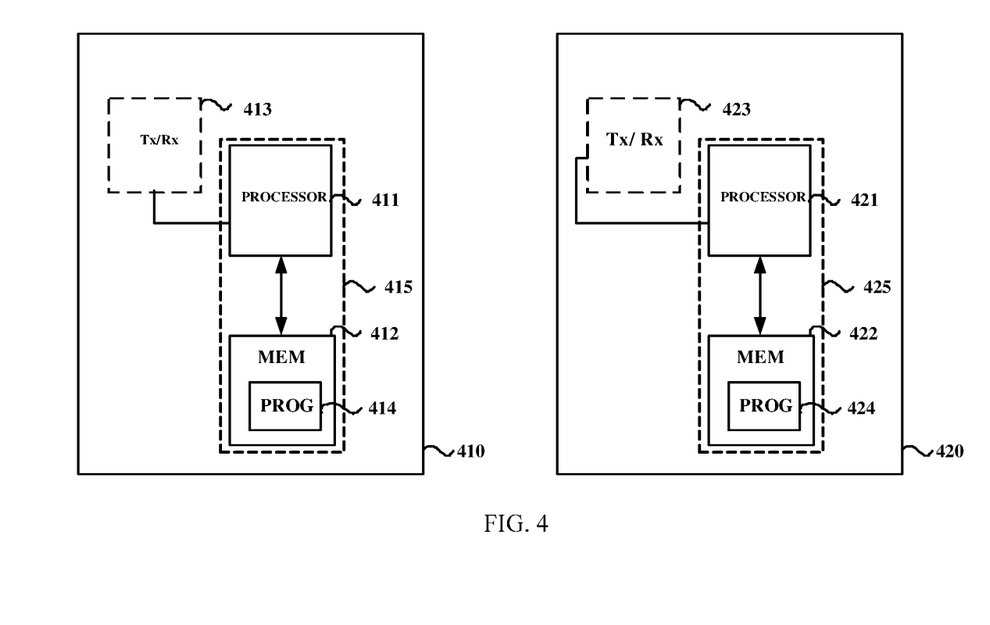
FIG. 4 illustrates a simplified block diagram of an apparatus that may be embodied as/in a network device, and an apparatus that may be embodied as/in a terminal device.

FIG. 4 illustrates a simplified block diagram of an apparatus 410 that may be embodied in/as a network device, for example, the network device 101 or 111 shown in FIG. 1, and an apparatus 420 that may be embodied in/as a terminal device, for example, any of the terminal devices 102-104 shown in FIG. 1.

The apparatus 410 may include one or more processors 411, such as a data processor (DP) and one or more memories (MEM) 812 coupled to the processor 411. The apparatus 410 may further include a transmitter TX and receiver RX 413 coupled to the processor 411. The MEM 412 may be non-transitory machine readable storage medium and it may store a program or a computer program product (PROG) 414. The PROG 414 may include instructions that, when executed on the associated processor 411, enable the apparatus 410 to operate in accordance with the embodiments of the present disclosure, for example to perform the method 300. A combination of the one or more processors 411 and the one or more MEMs 412 may form processing means 415 adapted to implement various embodiments of the present disclosure.

The apparatus 420 includes one or more processors 421, such as a DP, and one or more MEMs 422 coupled to the processor 421. The apparatus 420 may further include a suitable TX/RX 423 coupled to the processor 421. The MEM 422 may be non-transitory machine readable storage medium and it may store a PROG 424. The PROG 424 may include instructions that, when executed on the associated processor 421, enable the apparatus 420 to operate in accordance with the embodiments of the present disclosure, for example to perform the method 200. A combination of the one or more processors 421 and the one or more MEMs 422 may form processing means 825 adapted to implement various embodiments of the present disclosure.

Various embodiments of the present disclosure may be implemented by computer program or computer program product executable by one or more of the processors 411 and 421, software, firmware, hardware or in a combination thereof.

The MEMs 412 and 422 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 411 and 421 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a wireless communication system shown in FIG. 1, it should not be construed as limiting the spirit and scope of the present disclosure. The principle and concept of the present disclosure may be more generally applicable to other scenarios.

In addition, the present disclosure may also provide computer readable storage medium such as a memory containing the computer program or computer program product as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (for example, procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, and a combination thereof. For example, in one embodiment, each block of the block diagrams and flowchart illustrations, and combinations of blocks in the block diagrams and flowchart illustrations can be implemented by computer program or computer program product which includes computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method in a terminal device for random access in a wireless communication network, the method comprising:
   receiving a random access configuration from a network device, the random access configuration including information for determining a set of candidate subframe numbers for transmitting a random access preamble;
   transmitting the random access preamble in a subframe, the subframe being associated with a subframe number;
   wherein the subframe number is selected from the set of candidate subframe numbers, based on a size of a Message 3, Msg3, to be transmitted by the terminal device to the network device during the random access.

2. The method according to claim 1, wherein the random access preamble is selected from a set of candidate preambles based on the size of the Msg3.

3. The method according to claim 1, further comprising:
   receiving a further configuration for a set of thresholds with respect to the size of the Msg3 and a mapping configuration between the set of thresholds and PRACH transmissions; and
   determining a PRACH transmission based on the set of thresholds, to indicate the size of the Msg3 to the network device.

4. A method in a network device for random access in a wireless communication network, the method comprising:
   transmitting a random access configuration to a terminal device, the random access configuration including information for determining a set of candidate subframe numbers for transmitting a random access preamble;
   receiving, from the terminal device, a random access preamble in a subframe, the subframe being associated with a subframe number wherein the subframe number is selected from the set of candidate subframe numbers, based on a size of a Message 3, Msg3, to be transmitted by the terminal device to the network device during the random access; and
   determining the size of the Msg3, to be transmitted by the terminal device during the random access, based at least on the subframe number.

5. The method according to claim 4, wherein determining the size of the Msg3 comprises:
   determining the size of the Msg3 further based on the random access preamble.

6. An apparatus in a terminal device for random access in a wireless communication network, the apparatus comprising a processor and a memory, said memory containing instructions executable by said processor whereby said apparatus is operative to:
   receive a random access configuration from a network device, the random access configuration indicating a set of candidate subframe numbers for transmitting a random access preamble;
   transmit the random access preamble in a subframe, the subframe being associated with a subframe number;
   wherein the subframe number is selected from the set of candidate subframe numbers, based on a size of a Message 3, Msg3, to be transmitted by the terminal device to the network device during the random access.

7. The apparatus according to claim 6, wherein the random access preamble is selected from a set of candidate preambles based on the size of the Msg3.

8. The apparatus according to claim 6, wherein said memory containing instructions executable by said processor whereby said apparatus is operative to:
  receive a further configuration for a set of thresholds with respect to the size of the Msg3 and a mapping configuration between the set of thresholds and PRACH transmissions; and
  determine a PRACH transmission based on the set of thresholds, to indicate the size of the Msg3 to the network device.

\* \* \* \* \*